United States Patent [19]
Gabrelian et al.

[11] Patent Number: 5,737,698
[45] Date of Patent: Apr. 7, 1998

[54] ANTENNA/AMPLIFIER AND METHOD FOR RECEIVING ORTHOGONALLY-POLARIZED SIGNALS

[75] Inventors: Edward E. Gabrelian, Tarzana; Mark Lange, Camarillo, both of Calif.

[73] Assignee: California Amplifier Company, Camarillo, Calif.

[21] Appl. No.: 619,939

[22] Filed: Mar. 18, 1996

[51] Int. Cl.$^6$ ............................................. H04B 1/10
[52] U.S. Cl. ..................... 455/286; 333/21 A; 343/786; 455/293
[58] Field of Search ..................... 455/286, 293; 343/786, 772, 700 MS; 333/21 A, 21 R

[56] References Cited

U.S. PATENT DOCUMENTS

| | | | |
|---|---|---|---|
| 4,595,890 | 6/1986 | Cloutier | 343/786 X |
| 4,695,844 | 9/1987 | Houchangnia | 343/786 X |
| 4,996,535 | 2/1991 | Profera | 343/786 |
| 5,043,683 | 8/1991 | Howard | 333/21 A |
| 5,216,432 | 6/1993 | West | 343/786 |
| 5,398,004 | 3/1995 | Kobayashi | 330/293 |
| 5,463,407 | 10/1995 | West et al. | 343/786 |

FOREIGN PATENT DOCUMENTS

| | | | |
|---|---|---|---|
| 4207503 | 9/1993 | Germany | 333/21 A |

*Primary Examiner*—Thomas Mullen
*Attorney, Agent, or Firm*—Koppel & Jacobs

[57] ABSTRACT

An antenna/amplifier includes a waveguide and an amplifier system. The amplifier and signal lines which terminate in orthogonal probes are carried on a common substrate. The orthogonal probes are spaced from a waveguide wall and isolated for good cross polarization by a post which extends from the wall. The probes have probe tips which are spaced from the post by a probe space. Parameters which include the probe space, the impedance of the signal lines and the length of the signal lines can be selected to present an optimum impedance to low-noise amplifiers of the amplifier system.

51 Claims, 4 Drawing Sheets

ANTENNA/AMPLIFIER AND METHOD FOR RECEIVING ORTHOGONALLY-POLARIZED SIGNALS

BACKGROUND OF THE INVENTION

1. Field of the Invention

The present invention relates generally to microwave antennas and amplifiers.

2. Description of the Related Art

Various electronic systems require the ability to receive orthogonally-polarized microwave signals. For example, television receive-only systems (TVRO) are directed to the reception of orthogonally-polarized microwave signals which are typically transmitted from geostationary communication satellites. These transmissions include a plurality of television channels in designated frequency bands (e.g. C-band and Ku-band).

Because the frequency spectrum is limited, it is desirable to closely space the television channels. However, if the channel spacing is reduced past some minimum, the received channel-to-channel isolation begins to drop and, as a consequence, the received signal quality begins to deteriorate. To space the channels closer than this minimum, the transmission must be structured to facilitate reception which can discriminate against channels that are adjacent to a selected channel.

Accordingly, TVRO channels are transmitted with the electromagnetic polarization (orientation of the electric field) of adjacent channels in an orthogonal relationship. For example, if channels 1 through in are in order of increasing frequency, the odd-numbered channels are transmitted with a first linear polarization and the even-numbered channels are transmitted with a second linear polarization that is orthogonal to the first polarization.

Cross polarization is a measure of an antenna's ability to reject an undesired one of a pair of orthogonal polarizations. This antenna parameter can be tested in a laboratory by aligning the antenna to the polarization of a channel and recording a received power $P_1$. The antenna or the signal polarization is then rotated 90 degrees and a received power $P_2$ recorded. The antenna's cross polarization is then $10\log(P_1/P_2)$. In an antenna, a large cross polarization value, e.g.,>20 dB, indicates a good rejection of unwanted polarizations.

Noise figure is another important parameter in the reception of transmitted channels. Thermal noise $N_O$ at the input of an amplifier of gain G can be expected to result in an amplifier output noise power of $GN_O$. However, a real amplifier will produce an output power P which is greater than $GN_O$. This production of additional noise power is quantified as the amplifier's noise figure.

Therefore, an antenna/amplifier directed to the reception of orthogonally-polarized microwave signals preferably has a high cross polarization and a low noise figure. An antenna/amplifier which is directed to a consumer market (e.g., the TVRO market) must also be reliable and inexpensive. Unfortunately, the realization of antenna/amplifiers which have high cross polarization and low noise figure has typically resulted in units whose complexity and expense inhibit their attractiveness to a consumer market.

An exemplary antenna probe structure was disclosed in U.S. Pat. No. 4,996,535 issued Feb. 26, 1991 in the name of Charles E. Profera, Jr. and assigned to General Electric Company. An elongated center conductor is connected to a short circuiting plate at one end of a waveguide and it is stated that the abrupt termination of the center conductor forms a mode-generating step. Four probes are positioned between the short circuiting plate and the abrupt termination. The probes are organized in colinear pairs which are each aligned with one of a pair of orthogonally polarized signals.

Another exemplary antenna feed structure for receiving orthogonally 35 polarized signals was disclosed in U.S. Pat. No. 5,216,432 issued Jun. 1, 1993 in the name of Laurice J. West and assigned to California Amplifier Company, the assignee of the present invention. This structure included antenna probes which entered the end wall of an antenna feed horn and an isolation member with radial arms which extended from the end wall to reduce signal coupling between the probes.

Yet another exemplary antenna probe structure was disclosed in U.S. Pat. No. 5,463,407 issued Oct. 31, 1995 in the name of Laurice J. West, et al., and assigned to California Amplifier Company, the assignee of the present invention. This structure also taught the use of an isolation member but included orthogonally-arranged coplanar probes which extended through the side walls of an antenna feed horn.

Realizing the structures of these references requires cost-increasing fabrication steps, e.g., installing probes into waveguide walls (four probes in the case of Profera, Jr.) and arranging microwave cabling between the probes and an external low-noise amplifier. In addition, the insertion loss of the probe structure and the cabling directly increases the noise figure of an amplifier which is coupled to these antennas.

A structure for coupling energy between each of two transmission lines and a waveguide was disclosed in U.S. Pat. No. 5,043,683 issued Aug. 27, 1991 in the name of Kevin R. Howard and assigned to GEC-Marconi, Limited. In this reference, two orthogonal transmission lines and a coplanar patch are portions of the same microstripline structure which is received into a waveguide through a quarter-wave slot in the waveguide wall. The microstripline is preferably spaced substantially one-eighth of a wavelength from a short-circuited end of the waveguide. It is stated that this arrangement detunes the structure and improves the isolation between orthogonal polarizations.

SUMMARY OF THE INVENTION

The present invention is directed to an antenna/amplifier receiving system which has excellent receiving parameters (e.g., high cross polarization and low noise figure) and which is also compact, simple, reliable and inexpensive.

These goals are achieved with the realization that fabrication costs can be reduced by structuring a dual polarization antenna and a low-noise amplifier so that the antenna's probes and the amplifier share the same supporting substrate. Thus, the probes and amplifier interconnects can be produced by inexpensive, accurate photolithographic techniques and the antenna/amplifier can be easily and quickly assembled.

In addition to reducing costs, this structure enhances noise figure because it facilitates a short input transmission path to the amplifiers. This structure requires the probes to be coplanar which has typically reduced the cross polarization parameter of conventional antennas. Accordingly, it is also recognized that cross-polarization isolation between the coplanar probes can be provided by a coaxial post which is coupled to the antenna's end wall.

In addition, it has been found that the post and the tips of the antenna probes can be arranged and positioned to provide a capacitive loading which can be combined with the impedance transformation of the input transmission path to produce an input impedance of substantially gamma opt, an impedance which is conventionally specified by amplifier manufacturers and which optimizes the low noise performance of an amplifier. This simple structure eliminates the need for space-consuming impedance matching networks.

In one antenna/amplifier embodiment, the antenna includes a waveguide which is formed in two portions and the substrate carries a plurality of plated-through holes. The substrate is sandwiched between the waveguide portions with the plated-through holes positioned to electromagnetically connect the waveguide portions. The substrate includes first and second signal lines which terminate in first and second coplanar and orthogonal microwave probes that extend into the waveguide. A low-noise amplifier system is carried on the substrate with the first and second signal lines coupled to first and second low-noise amplifiers of the system.

Although the waveguide and post of the invention can be arranged in various useful configurations, e.g., a square waveguide and a cylindrical post, a cylindrical waveguide and a coaxial, cylindrical post have been found particularly effective (and inexpensive) for enhancing probe isolation and cross polarization and for realizing a gamma opt impedance.

Antenna/amplifier embodiments which are particularly suited for the reception of circularly-polarized orthogonal signals can be formed by insertion of a polarization transformer in the waveguide.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
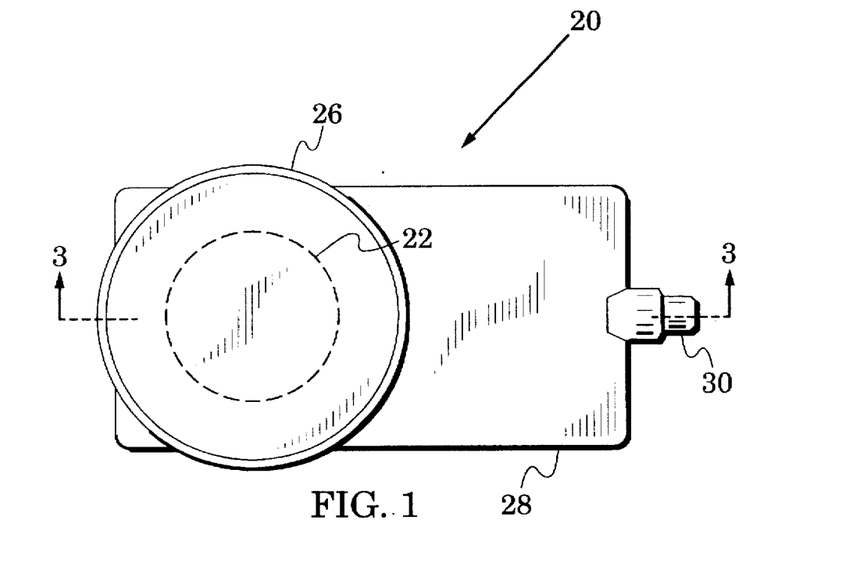
FIG. 1 is top plan view of an antenna/amplifier in accordance with the present invention.
Figure 2:
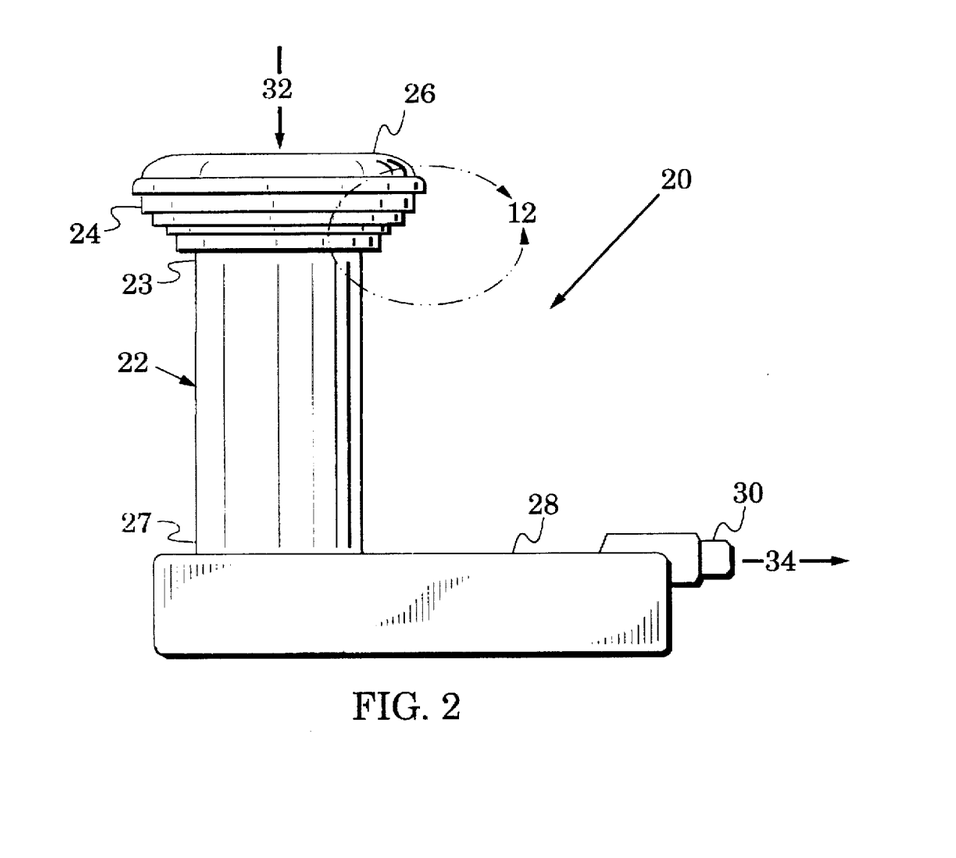
FIG. 2 is a side elevation view of the antenna/amplifier of FIG. 1.

A receiving system in the form of an integrated, microwave antenna/amplifier embodiment 20 is shown in FIGS. 1 and 2. The antenna/amplifier 20 includes a waveguide 22 which terminates at an upper end 23 in a horn 24. The interiors of the waveguide 22 and the horn 24 are protected from the environment by a microwave-transparent radome 26. The waveguide 22 is joined at a lower end 27 with a housing 28 which contains an amplifier that is coupled between the waveguide 22 and an output port 30 which is positioned at one side of the housing 28.

In operation of the antenna/amplifier 20, multiple channels of orthogonally-polarized microwave signals 32 are received through the radome 26 and into the horn 24 and waveguide 22. In response, each of these microwave signals is down converted by a fixed-frequency local oscillator and respective downconverted signals 34 are delivered at the output port 30. For example, the microwave signals 32 can include odd-numbered channels 1, 3, 5 and so on which have a first linear polarization and even-numbered channels 2, 4, 6 and so on which have a second linear polarization which is orthogonal to the first linear polarization. The structure of the antenna/amplifier 20 enhances its cross polarization and noise figure parameters as it receives the microwave signals 32 and generates the downconverted signals 34. The structure also facilitates low-cost fabrication and assembly operations. Further discussion of the operation of the antenna/ amplifier 20 is preceded by the following detailed description of its preferred structure.

Figure 3:
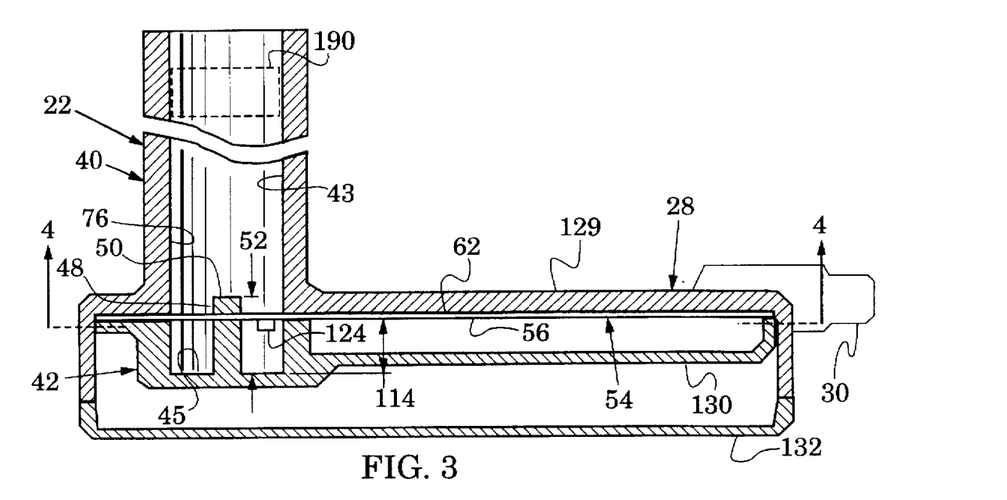
FIG. 3 is an enlarged view along the plane 3—3 of FIG. 1.

FIG. 3 illustrates that the waveguide 22 is formed of an upper tube portion 40 and a lower cup portion 42. The tube 40 has an open end 43 for reception of microwave signals. The cup 42 terminates in a transverse wall 45. An isolation member in the form of a cylindrical isolation post 48 extends upward from the wall 45. The post 48 terminates in a post end 50 which is spaced from the wall 45 by a post space 52. A substrate 54 of a low-loss microwave material (e.g., ceramic) is positioned between the tube 40 and the cup 42.

Figure 4:
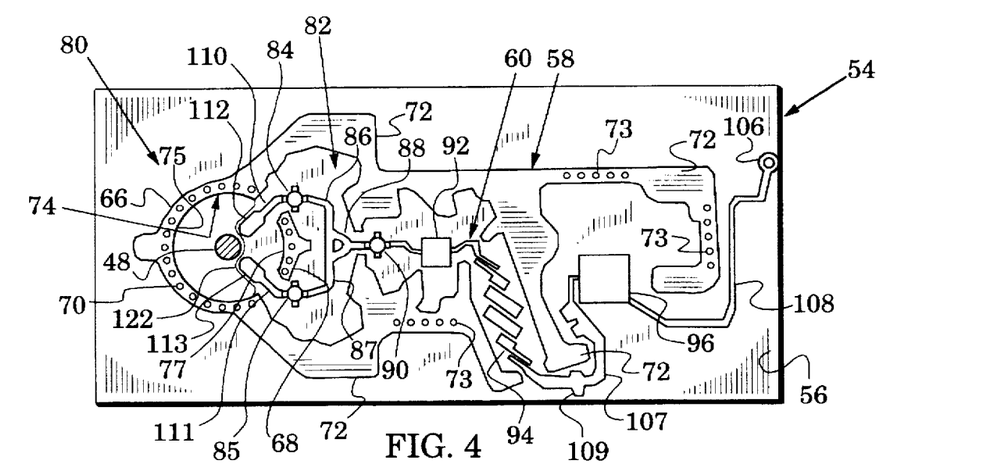
FIG. 4 is a view along the plane 4—4 of FIG. 3 which shows a waveguide, a waveguide post and a microstrip circuit board in the antenna/amplifier of FIGS. 1 and 2.
Figure 5:
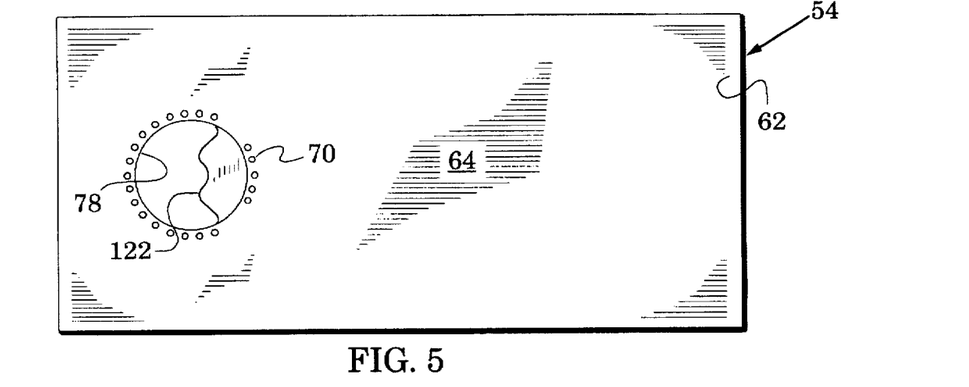
FIG. 5 is a view of a ground plane on an opposite side of the microstrip circuit board of FIG. 4.

FIG. 4 shows that one side 56 of the substrate 54 carries metallic signal isolation regions 58 and a set of signal lines 60, while FIG. 5 shows that another side 62 carries a patterned metallic ground plane 64. The signal line set 60 and the ground plane 64 are configured as microstrip transmission lines and the substrate 54 is positioned with its side 56 facing the transverse wall 45 (in FIG. 3). The isolation regions 58, signal line set 60 and ground plane 64 can be photolithographically defined and plated with a low-loss material, e.g., copper.

In particular, the isolation regions 58 include a first partial ring 66 and a second partial ring 68. These partial rings have a plurality of plated-through holes 70 which connect the partial rings with the ground plane 64. The partial rings 66 and 68 are dimensioned and positioned so that they lie between the cup 42 and the tube 40 and electromagnetically couple them together. The spacing between the plated-through holes 70 is small enough to cause the gap between them to appear as a waveguide whose cutoff frequency far exceeds the operational frequency of the antenna/amplifier 20.

The isolation regions 58 also include various subregions 72 which are arranged to provide isolation between different portions of the antenna/amplifier 20. A plurality of plated-through holes 73 connect these subregions 72 with the ground plane 64. For clarity of illustration, only a few exemplary holes 73 are shown in the subregions 72.

The substrate 54 forms an opening 74 which permits passage of the post 48 through the substrate (because the substrate 54 is shown in full in FIG. 3, it appears to cut across the sectioned post 48 in that figure). One perimeter portion 75 of the opening 74 is in the form of a semicircle which is aligned with the interior surface 76 (shown in FIG. 3) of the waveguide 22. A concave side 77 of the second partial ring 68 is also formed as a semicircle and is also aligned with the interior surface 76 of the waveguide 22. The perimeter portion 75 and the concave side 77 are further aligned with a circular opening 78 in the ground plane 64.

Figure 6:
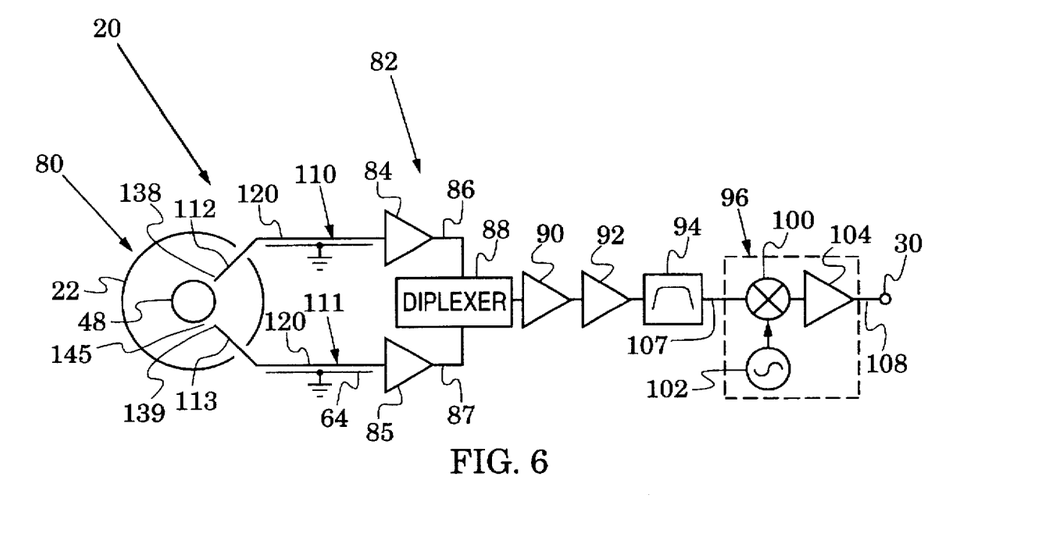
FIG. 6 is a block diagram of the antenna/amplifier of FIGS. 1 and 2.

The active elements of the antenna/amplifier 20 can best be described with simultaneous reference to FIGS. 4 and 6, which show an antenna portion 80 and an amplifier system 82. The amplifier 82 includes low-noise amplifiers 84 and 85 which are coupled by signal lines 86 and 87 to a diplexer 88. The output of the diplexer 88 is coupled through a second-stage amplifier 90 and a third-stage amplifier 92 to a bandpass filter 94.

A microwave integrated circuit (MMIC) forms a downconverter 96. The downconverter 96 includes a mixer 100 which is coupled to a local oscillator 102 and an output amplifier 104. The downconverter 96 is coupled between the bandpass filter 94 and a signal line end 106 by signal lines 107 and 108. The signal line end 106 is connected to a conventional connector (shown in FIGS. 1–3) which forms the output port 30. The signal lines 86, 87, 107, and 108 may include various impedance matching structures, e.g., capacitive, open ended shunt stubs 109.

In addition to signal lines 86, 87, 106 and 107, the signal line set 60 includes signal lines 110 and 111 which are coupled respectively to the inputs of the low-noise amplifiers 84 and 85. Opposite the amplifier inputs, the signal lines 110 and 111 terminate respectively in coplanar and orthogonal antenna probes 112 and 113. The coplanar microwave probes extend into the waveguide 22, are directed at the post 48 and are spaced from the transverse wall 45 by a probe space 114 (shown in FIG. 3).

Each of the signal lines 110 and 111 includes an impedance matching portion 120 which has a transmission length between its respective microwave probe and its respective low-noise amplifier. For clarity of illustration, the presence of the ground plane 64 in the impedance matching portion 120 is indicated in FIG. 6.

The substrate 54 includes a lip 122 which extends into the waveguide 22 and supports the probes 112 and 113. The lip 122 is configured to permit the post 48 to pass through the substrate 54. The signal lines 110 and 111 pass through gaps between the first partial ring 66 and the second partial ring 68. In addition, the cup portion 42 of the waveguide 22 includes grooves 124 (one of the grooves is shown in FIG. 3). These grooves and the tube 40 form apertures which isolate the signal lines 110 and 111 from the waveguide 22.

The operation of the antenna/amplifier 20 can be described by assuming that n channels are transmitted from a satellite with channels 1 through n in order of increasing frequency. The odd-numbered channels are transmitted with a first linear polarization and the even-numbered channels are transmitted with a second linear polarization that is orthogonal to the first polarization.

The antenna/amplifier 20 is positioned so that the orthogonal probes 112 and 113 are aligned with the orthogonally polarized channels. For example, the polarization of the even-numbered channels can be aligned with the probe 112 and the polarization of the odd-numbered channels aligned with the probe 113. The detected signals are coupled through the signal lines 110 and 111 to the low-noise amplifiers 84 and 85.

After amplification, the signals are further amplified in second-stage and third-stage amplifiers 90 and 92. The signals pass through the bandpass filter 94, which removes out-of-band spurious signals. Finally, the amplified and filtered signals are downconverted by the downconverter 96 and conducted to the output port 30 by the signal line 108.

The downconverted signals are available at the output port 30 for connection to a downstream receiver, e.g., a television receiver. This downstream receiver can send a selection signal to the antenna/amplifier 20 to select either even-numbered or odd-numbered channels at the output port 30. This selection signal is used to selectively couple either of these received channel sets into the diplexer 88. This selective coupling can be realized with a variety of conventional switching techniques, e.g., by selectively applying bias voltage to the amplifiers 84 and 85. Further selection of a single channel from the selected one of the even-numbered or odd-numbered channels is performed by the downstream receiver.

In the antenna/amplifier 20, the amplifier 82 and the microwave probes 112 and 113 are positioned on the same substrate 54. This facilitates the use of accurate and inexpensive photolithographic fabrication techniques. Assembly operations are reduced to the installation of parts onto the substrate 54 and the insertion of the assembled substrate between the waveguide tube 40 and the waveguide cup 42.

Fabrication costs can be further reduced by forming the waveguide tube 40 and a large portion 129 of the housing 28 as an integral part and the waveguide cup 42 and a substrate cover 130 as another integral part as shown in FIG. 3. The substrate cover 130 is configured to isolate the amplifier 82 and to suppress unwanted electromagnetic modes in the amplifier. A simple environmental cover 132 completes the housing 28.

Positioning the microwave probes in a coplanar relationship has conventionally reduced the isolation and cross polarization of the probes. However, it has been found that good isolation and cross polarization is obtained in coplanar probes by the addition of the post 48 which is coupled to the transverse wall 45.

In particular, it has been found that these parameters are enhanced if the probe space 114 (of FIG. 3) is between $(\lambda_{g_{avg}})/4$ and $(\lambda_{g_{avg}})/6$, in which $\lambda_{g_{avg}}$ is the average of the guide wavelength $\lambda_g$ across the received signal band in the waveguide 22. These parameters are also enhanced when the post space 52 (of FIG. 3) exceeds the probe space by between $(\lambda_{g_{avg}})/10$ and $(\lambda_{g_{avg}})/14$. It has been found that these parameters are particularly enhanced when the probe space 114 is substantially $(\lambda_{g_{avg}})/5$ and the post space 52 exceeds the probe space by substantially $(\lambda_{g_{avg}})/12.5$. Preferably, the diameter of the waveguide 40 is on the order of $(\lambda_{g_{avg}})/2$ and the diameter of the post 48 is on the order of $(\lambda_{g_{avg}})/10$.

Figure 7:
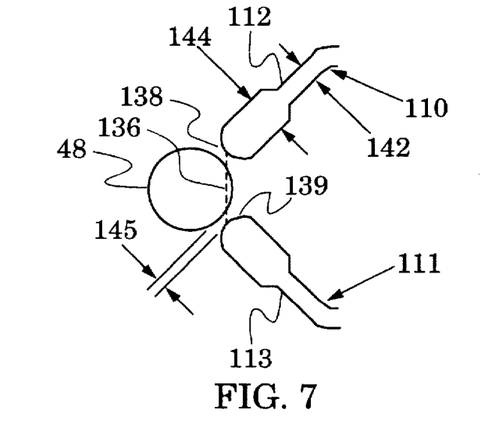
FIG. 7 is an enlarged view of a waveguide post and probe embodiment in the antenna/amplifier of FIGS. 1 and 2.

FIG. 7 shows that the probes 112 and 113 respectively terminate in probe tips 138 and 139. The isolation and polarization parameters are also enhanced by configuring the post 48 and the probes 112 and 113 so that a line-of-sight 136 (indicated by a broken line) between probe tips 138 and 139 is blocked by the post 48, i.e., at least a portion of the post 48 is positioned between the probe tips 138 and 139. FIG. 7 also illustrates that the probes 112 and 113 have a width 142 and their probe tips 138 and 139 have a width 144 that is wider than the probe width 142. The probe tips 138 and 139 are spaced from the post 48 by a tip space 145.

Figure 8:
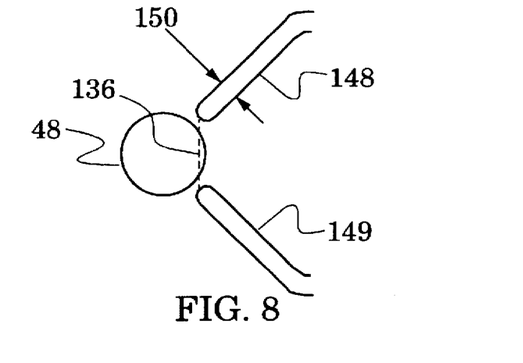
FIG. 8 is view similar to FIG. 7 which shows another waveguide post and probe embodiment.

FIG. 8 illustrates another probe configuration in which a set of orthogonal probes 148 and 149 have a constant width 150. It has been found that although the probe configuration of FIG. 7 generally has somewhat greater cross polarization than that of FIG. 8, the probe configuration of FIG. 8 is especially suited for broad band applications.

Although the cylindrical waveguide 40 and coaxial and cylindrical post 48 have been found to be particularly effective (and inexpensive) in obtaining probe isolation and cross polarization, other waveguide and probe configurations can also be effective. Exemplary embodiments include the square waveguide 152 and cylindrical post 154 shown schematically in FIG. 9 and the cylindrical waveguide 156 and the cylindrical post 158 shown schematically in FIG. 10. The post 158 includes radial arms 160 which are preferably positioned so that one of them extends between the waveguide probes which are illustrated by exemplary probes 162 and 164.

The signal-to-noise ratio of the downconverted signals at the output port 30 is determined by a number of parameters, e.g., the noise figures of the second-stage and third-stage amplifiers 90 and 92, the insertion loss of the diplexer 88 and the insertion loss of the signal lines 86 and 87 (all shown in FIGS. 4 and 6). However, the signal-to-noise ratio of the antenna/amplifier 20 is primarily set by the noise figure of the low-noise amplifiers 84 and 85 and the insertion loss of the signal lines 110 and 111.

Accordingly, the antenna/amplifier 20 is structured to reduce the length of the signal lines 110 and 111 and to present an impedance of gamma opt ($\Gamma_{opt}$) to the low-noise amplifiers 84 and 85. Manufacturers of low-noise amplifiers typically list the input impedance which maximizes the low-noise performance of their amplifiers. By convention, this impedance is referred to as gamma opt.

Figure 11:
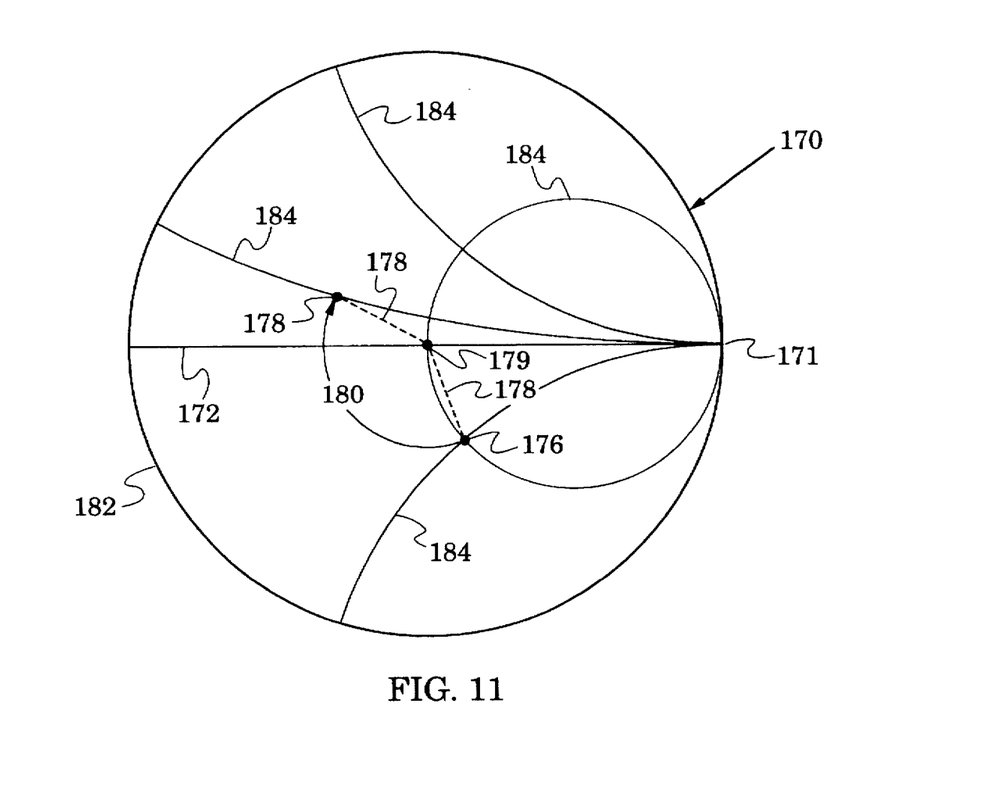
FIG. 11 is a Smith chart which illustrates impedance transformations in the antenna/amplifier of FIGS. 1 and 2.

This structure of the antenna/amplifier 20 can be described with reference to FIG. 6 and to the Smith chart 170 of FIG. 11. The Smith chart is conventionally arranged with the infinite impedance 171 of the real impedance line 172 positioned at the right side of the chart 170. The complex impedance gamma opt of the low-noise amplifiers 84 and 85 typically has a real part and an inductive imaginary part, e.g., $z_{r_{amp}}+jz_{i_{amp}}$. It has been found that the complex impedance of the microwave probes 138 and 139 typically have a real part and a capacitive imaginary part, e.g., $z_{r_{prob}}-jz_{i_{prob}}$. The probe impedance is measured substantially at the point where the probes cross the perimeter of the waveguide 22.

Once a transmission line impedance $z_{trans}$ has been selected for the impedance matching portion 120 of the signal lines 110 and 111, this impedance can be used to divide (normalize) the probe impedance and the result plotted on the Smith chart as a source impedance. Gamma opt is also divided (normalized) by this probe impedance and plotted on the Smith chart as a load impedance. By proper choice of the probe structure, $z_{trans}$, and the length of the impedance matching portion 120, the impedance gamma opt can be presented to the low-noise amplifiers 84 and 85 (the selected transmission line impedance $z_{trans}$ is set conventionally by proper selection of signal line width and spacing between the line and the ground plane).

For example, if the probe impedance is 50 ohms−j30 ohms and gamma opt is 28 ohms+j7 ohms, $z_{trans}$ can be selected to be 50 ohms so that the load impedance is 1−j0.6 ohms and gamma opt is substantially 0.56 +j 0.14 ohms. These impedances are shown respectively as the source impedance 176 and the load impedance 178 on the Smith chart 170. The source impedance 176 is transformed along a constant radius 178 (which represents a constant reflection coefficient) from the chart center 179 by a wavelength portion 180 that brings it to the desired load impedance 178. This wavelength portion 180 is read off of the perimeter 182 of the Smith chart as substantially 0.178 $\lambda_{g_{avg}}$ (in which $\lambda_{g_{avg}}$ is the average of the guide wavelength $\lambda_g$ across the received signal band). For clarity of illustration, exemplary constant reactance lines 184 have been included in the Smith chart 170.

It has been found that the probe impedance can be varied by varying probe and post parameters such as the probe width 142, the probe tip width 144, the tip space 145 and the diameter of the post 48. In particular, the capacitive probe impedance is a function of the tip space 145 which facilitates the generation of a post-to-tip capacitance. Thus, a proper selection of these parameters in addition to $z_{trans}$ and the length of the signal lines 110 and 111 can present substantially gamma opt to the low-noise amplifiers 84 and 85. Not only does this form a simple, space conserving matching structure, but the insertion loss ahead of the low-noise amplifiers is limited because it is substantially that of the short signal lines 111 and 112.

Figure 12:
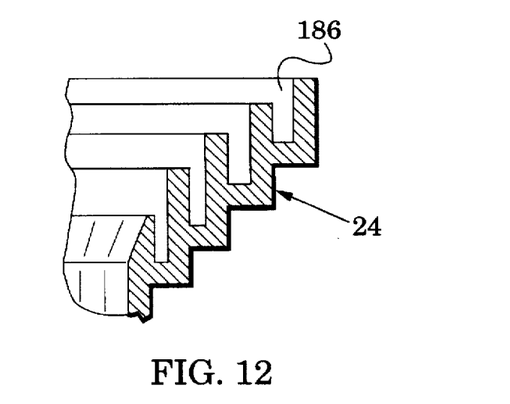
FIG. 12 is a sectional view of the structure within the curved line 12 of FIG. 2.

As illustrated in FIG. 12, the horn 24 is flared outward to enhance the impedance match between that of free space (~377 ohms) and that of the waveguide 22 (e.g., ~650 ohms). The horn 24 forms a plurality of annular mode-suppression rings 186 to further enhance microwave signal reception.

An exemplary Ku-band prototype of the antenna/amplifier 20 of FIGS. 1–3 was fabricated and tested. The low-noise amplifiers (84 and 85 of FIG. 4) of the prototype were part number NE32584C, which is manufactured by NEC of Tokyo, Japan. The listed gamma opt impedance of these amplifiers is substantially 15 ohms+j13.5 ohms at 12 GHz. The microwave substrate (54 of FIG. 4) was part number RO4003 manufactured by Rogers Company of Phoenix, Ariz. This is a low-loss microwave substrate of ceramic over plexiglass laminate which had a thickness of ~0.5 millimeter.

The waveguide (22 in FIG. 3) had a diameter of ~17.8 millimeters and the post (48 in FIG. 3) had a diameter of ~3.8 millimeters. The probe space (114 in FIG. 3) was ~0.2 $\lambda_{g_{avg}}$ and the post space (52 in FIG. 3) exceeded the probe space by ~0.08 $\lambda_{g_{avg}}$.

To develop the gamma opt input impedance for the low-noise amplifiers, the tip space (145 in FIG. 7) was ~0.9 millimeter and the line length of the impedance matching portion (120 in FIG. 6) was approximately 0.13 $\lambda_{g_{avg}}$.

Across a bandwidth of 500 MHz centered at 12.5 GHz, the prototype had a measured noise figure on the order of 0.9 dB and a measured cross polarization on the order of 24 dB.

The structures described above facilitate the realization of compact, simple, reliable and inexpensive antenna/amplifiers. The antenna structure dimensions can be selected to realize excellent cross polarization parameters, while the antenna and amplifier structures can be selected to present substantially gamma opt impedance to the low-noise amplifiers with the aid of short, low-loss transmission lines.

Figure 9:
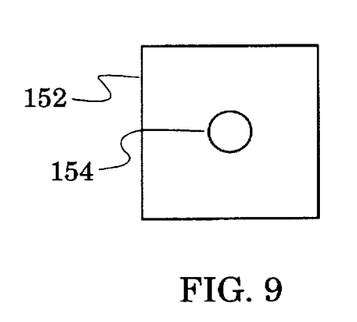
FIG. 9 is a schematic view of another waveguide and post embodiment.
Figure 10:
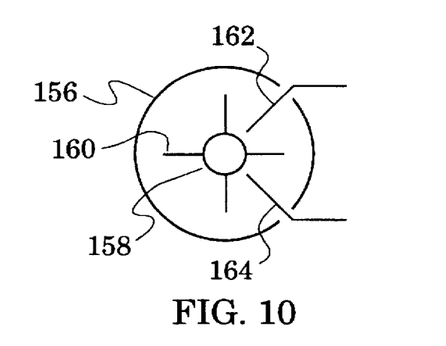
FIG. 10 is a schematic view of another waveguide, post and probe embodiment.

Although other useful arrangements have been shown, e.g., FIGS. 9 and 10, the cylindrical waveguide 40 and coaxial and cylindrical post 48 of FIG. 3 have been found particularly effective (and inexpensive) for enhancing probe isolation and cross polarization and for realizing a gamma opt impedance.

In addition, the structures of the invention facilitate the use of a common substrate which can be fabricated with inexpensive and accurate photolithographic techniques. Photolithographic fabrication methods of microstrip circuit boards are well developed and these methods can simultaneously generate the amplifier interconnects and the microwave probes of the substrate.

Although receiving systems of the invention have been described with reference to the reception of linearly-polarized microwave signals, the teachings of the invention may also be applied to the reception of other polarization relationships. For example, circularly-polarized orthogonal signals can be received by inserting a conventional polarization transformer 190 into the waveguide 22 as shown in FIG. 3. The transformer 190 converts these signals into linearly-polarized orthogonal signals which are then received as described above.

The preferred embodiments of the invention described herein are exemplary and numerous modifications, variations and rearrangements can be readily envisioned to achieve an equivalent result, all of which are contemplated and can be made without departing from the spirit and scope of the invention as defined in the appended claims.

We claim:

1. A receiving system for receiving orthogonally-polarized microwave signals comprising:
   a waveguide having an open end for receipt of said microwave signals and terminating in a transverse wall;
   a substrate carrying first and second signal lines which respectively form first and second coplanar and orthogonal microwave probes, said substrate joined with said waveguide with said microwave probes extending into said waveguide;
   an isolation member extending into said waveguide from said wall and terminating in an isolation member end; and
   a low-noise amplifier system carried on said substrate, said amplifier system having first and second low-noise amplifiers which are coupled respectively to said first and second signal lines;
   wherein said amplifier system further includes:
   a second stage amplifier; and
   a diplexer which selectively couples said second stage amplifier to said first and second low-noise amplifiers.

2. A receiving system for receiving orthogonally-polarized microwaves signals, comprising:
   a waveguide having an open end for receipt of said microwave signals and terminating in a transverse wall;
   a substrate carrying first and second signal lines which respectively form first and second coplanar and orthogonal microwave probes, said substrate joined with said waveguide with said microwave probes extending into said waveguide;
   an isolation member extending into said waveguide from said wall and terminating in an isolation member end; and
   a low-noise amplifier system carried on said substrate, said amplifier system having first and second low-noise amplifiers which are coupled respectively to said first and second signal lines;
   wherein said amplifier system further includes:
   a downconverter which has:
   a) a mixer; and
   b) a local oscillator coupled to said mixer; and
   a diplexer which selectively couples said mixer to said first and second low-noise amplifiers.

3. A receiving system for receiving orthogonally-polarized microwave signals, comprising:
   a waveguide having an open end for receipt of said microwave signals and terminating in a transverse wall;
   a substrate carrying first and second signal lines which respectively form first and second coplanar and orthogonal microwave probes, said substrate joined with said waveguide with said microwave probes extending into said waveguide; and
   an isolation member extending into said waveguide from said wall and terminating in an isolation member end;
   wherein said substrate includes a ground plane, and said first and second microwave signal lines each include a portion which is arranged with said ground plane as microstrip transmission lines.

4. The receiving system of claim 3, wherein said first and second probes are spaced from said wall by a probe space and said isolation member end is spaced from said wall by an end space which exceeds said probe space.

5. The receiving system of claim 3, wherein said first and second microwave probes are directed at said isolation member and respectively terminate in first and second probe tips which hare each spaced from said isolation member.

6. The receiving system of claim 3, wherein said substrate includes a plurality of plated-through holes and said waveguide includes:
   a first waveguide portion which includes said open end; and
   a second waveguide portion which includes said wall;
   and wherein said substrate is positioned between said first and second waveguide portions with said plated-through holes positioned to electromagnetically connect said first and second waveguide portions.

7. The integrated antenna and amplifier for receiving orthogonally-polarized microwave signals comprising:
   a waveguide having an open end for receipt of said microwave signals and terminating in a transverse wall;
   a substrate carrying first and second signal lines which respectively terminate in first and second coplanar and orthogonal microwave probes, said substrate joined with said waveguide with said microwave probes extending into said waveguide and spaced from said wall by a probe space;
   a low-noise amplifier system including first and second low-noise amplifiers which are coupled respectively to said first and second signal lines; and
   a post extending into said waveguide from said wall and terminating in a post end which is spaced from said wall by a post space which exceeds said probe space;
   wherein:
   each of said first and second low-noise amplifiers requires an input impedance of gamma opt to optimize their low-noise performance;
   said first and second microwave probes respectively terminate in first and second probe tips which are each spaced from said post by a tip space to generate a post-to-tip capacitance;
   each of said first and second signal lines includes an impedance matching portion which has a transmission length between its respective microwave probe and its respective low-noise amplifier; and
   said tip space and said transmission length present an impedance which substantially equals gamma opt to said first and second low-noise amplifiers.

8. The integrated antenna and amplifier of claim 7, wherein said substrate includes a ground plane, and said impedance matching portion and said ground plane are arranged as a microstrip transmission line.

9. An integrated antenna and amplifier for receiving orthogonally-polarized microwave signals, comprising:
   a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a low-noise amplifier system including first and second low-noise amplifiers which are coupled respectively to said first and second signal lines; and a post extending into said waveguide from said wall and terminating in a post end which is spaced from said wall by a post space which exceeds said probe space;

wherein said microwave signals have an average guide wavelength $\lambda_{g_{avg}}$ and said post space exceeds said probe space by between $\lambda_{g_{avg}}/14$ and $\lambda_{g_{avg}}/10$.

10. An integrated antenna and amplifier for receiving orthogonally-polarized microwave signals comprising:

a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a low-noise amplifier system including first and second low-noise amplifiers which are coupled respectively to said first and second signal lines; and a post extending into said waveguide from said wall and terminating in a post end which is spaced from said wall by a post space which exceeds said probe space;

wherein said microwave signals have an average wavelength $\lambda_{g_{avg}}$ and said probe space is between $\lambda_{g_{avg}}/6$ and $\lambda_{g_{avg}}/4$.

11. The integrated antenna and amplifier of claim 10, wherein said low-noise amplifier system is carried on said substrate.

12. The integrated antenna and amplifier of claim 10, wherein said first and second microwave probes respectively terminate in first and second probe tips which are each spaced from said post by a tip space to generate a post-to-tip capacitance.

13. The integrated antenna and amplifier of claim 12, wherein said first and second microwave probes have a probe width and said first and second probe tips have a tip width which is wider than said probe width.

14. The integrated antenna and amplifier of claim 12, wherein said first and second microwave probes and said post are arranged so that at least a portion of said post is positioned between said first and second probe tips.

15. The integrated antenna and amplifier of claim 10, wherein said substrate includes a plurality of plated-through holes and said waveguide includes:

a first waveguide portion which includes said open end; and a second waveguide portion which includes said wall;

and wherein said substrate is positioned between said first and second waveguide portions with said plated-through holes positioned to electromagnetically connect said first and second waveguide portions.

16. The integrated antenna and amplifier of claim 10, wherein said substrate extends into said waveguide and supports said first and second microwave probes.

17. The integrated antenna and amplifier of claim 10, wherein said waveguide is a circular waveguide, said post is a cylindrical post and said circular waveguide and said cylindrical post are coaxially arranged.

18. The integrated antenna and amplifier of claim 10, wherein said waveguide includes a tapered horn at said open end to enhance the receipt of said microwave signals.

19. The integrated antenna and amplifier of claim 10, wherein said waveguide forms first and second apertures which are positioned to isolate said first and second signal lines from said waveguide.

20. An integrated antenna and amplifier for receiving orthogonally-polarized microwave signals, comprising:

a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a low-noise amplifier system including first and second low-noise amplifiers which are coupled respectively to said first and second signal lines; and a post extending into said waveguide from said wall and terminating in a post end which is spaced from said wall by a post space which exceeds said probe space;

wherein said waveguide is a square waveguide, said post is a cylindrical post and said square waveguide and said cylindrical post are coaxially arranged.

21. An integrated antenna and amplifier for receiving orthogonally-polarized microwave signals comprising:

a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a low-noise amplifier system including first and second low-noise amplifiers which are coupled respectively to said first and second signal lines; and a post extending into said waveguide from said wall and terminating in a post end which is spaced from said wall by a post space which exceeds said probe space;

wherein said amplifier system further includes:

a second stage amplifier; and a diplexer which selectively couples said second stage amplifier to said first and second low-noise amplifiers.

22. An integrated antenna and amplifier for receiving orthogonally-polarized microwave signals comprising:

a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a low-noise amplifier system including first and second low-noise a amplifiers which are coupled respectively to said first and second signal lines; and a post extending into said waveguide from said wall and terminating in a post end which is spaced from said wall by a post space which exceeds said probe space;

wherein said amplifier system further includes:
a downconverter which has:
a) a mixer; and
b) a local oscillator coupled to said mixer; and
a diplexer which selectively couples said mixer to said first and second low-noise amplifiers.

23. An integrated antenna and amplifier for receiving orthogonally-polarized microwave signals, comprising:
a waveguide having an open end for receipt of said microwave signals and terminating in a transverse wall;
a substrate carrying first and second signal lines which respectively terminate in first and second coplanar and orthogonal microwave probes, said substrate joined with said waveguide with said microwave probes extending into said waveguide and spaced from said wall by a probe space;
a low-noise amplifier system carried on said substrate and including first and second low-noise amplifiers which are coupled respectively to said first and second signal lines; and
a post extending into said waveguide from said wall and terminating in a post end which is spaced from said wall by a post space which exceeds said probe space;
wherein each of said first and second low-noise amplifiers requires an input impedance of gamma opt to optimize their low-noise performance;
said first and second microwave probes respectively terminate in first and second probe tips which are each spaced from said post by a tip space to generate a post-to-tip capacitance;
each of said first and second signal lines includes an impedance matching portion which has a transmission length between its respective microwave probe and its respective low-noise amplifier; and
said tip space and said transmission length are sufficient to present an impedance which substantially equals gamma opt to said first and second low-noise amplifiers.

24. The integrated antenna and amplifier of claim 23, wherein said substrate includes a ground plane and said impedance matching portion and said ground plane are arranged as a microstrip transmission line.

25. The integrated antenna and amplifier of claim 23, wherein said first and second microwave probes and said post are arranged so that at least a portion of said post is positioned between said first and second probe tips.

26. The integrated antenna and amplifier of claim 23, wherein said microwave signals have an average guide wavelength $\lambda_{g_{avg}}$ and said post space exceeds said probe space by between $\lambda_{g_{avg}}/14$ and $\lambda_{g_{avg}}/10$.

27. The integrated antenna and amplifier of claim 26, wherein said microwave signals have an average wavelength $\lambda_{g_{avg}}$ and said probe space is between $\lambda_{g_{avg}}/6$ and $\lambda_{g_{avg}}/4$.

28. The integrated antenna and amplifier of claim 23, wherein said substrate includes a plurality of plated-through holes and said waveguide includes:
a first waveguide portion which includes said open end; and
a second waveguide portion which includes said wall;
and wherein said substrate is positioned between said first and second waveguide portions with said plated-through holes positioned to electromagnetically connect said first and second waveguide portions.

29. The integrated antenna and amplifier of claim 23, wherein said waveguide is a circular waveguide, said post is a cylindrical post and said circular waveguide and said cylindrical post are coaxially arranged.

30. The integrated antenna and amplifier of claim 23, wherein said waveguide is a square waveguide, said post is a cylindrical post and said square waveguide and said cylindrical post are coaxially arranged.

31. The integrated antenna and amplifier of claim 23, wherein said waveguide includes a tapered horn at said open end to enhance the receipt of said microwave signals.

32. The integrated antenna and amplifier of claim 23, wherein said waveguide forms first and second apertures which are positioned to isolate said first and second signal lines from said waveguide.

33. An antenna for coupling orthogonally-polarized microwave signals to first and second signal lines comprising:
a waveguide having an open end for receipt of said microwave signals and terminating in a transverse wall;
a substrate carrying first and second signal lines which respectively terminate in first and second coplanar and orthogonal microwave probes, said substrate joined with said waveguide with said microwave probes extending into said waveguide and spaced from said wall by a probe space;
a post extending into said waveguide from said wall and terminating in a post end which is spaced from said wall by a post space which exceeds said probe space; and
first and second probe tips formed respectively by said first and second microwave probes and spaced from said post by a tip space to generate a post-to-tip capacitance;
wherein said substrate includes a ground plane and at least a portion of each of said first and second signal lines and said ground plane are arranged as a microstrip transmission line.

34. The antenna of claim 33, whrein said first and second microwave probes and said post are arranged so that at least a portion of said post is positioned between said first and second probe tips.

35. The antenna of claim 33, wherein said substrate includes a plurality of plated-through holes and said waveguide includes:
a first waveguide portion which includes said open end; and
a second waveguide portion which includes said open end; and
and wherein said substrate is positioned between said first and second waveguide portion with said plated-through holes positioned to electromagnetically connect said first and second waveguide portions.

36. The antenna of claim 33, wherein said first and second microwave probes have a probe width and said first and second probe tips have a tip width which is wider than said probe width.

37. The antenna of claim 33, wherein said substrate extends into said waveguide and supports said first and second microwave probes.

38. The antenna of claim 33, wherein said waveguide is a circular waveguide, said post is a cylindrical post and said circular waveguide and said cylindrical post are coaxially arranged.

39. The antenna of claim 33, wherein said waveguide includes a tapered horn at said open end to enhance the receipt of said microwave signals.

40. The antenna of claim 33, wherein said waveguide forms first and second apertures which are positioned to isolate said first and second signal lines from said waveguide.

41. An antenna for coupling orthogonally-polarized microwave signals to first and second signal lines, comprising:
a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a post extending into said waveguide from said wall and terminating in a post end which is spaced from said wall by a post space which exceeds said probe space; and first and second probe tips formed respectively by said first and second microwave probes and spaced from said post by a tip space to generate a post-to-tip capacitance;

wherein said microwave signals have an average guide wavelength $\lambda_{g_{avg}}$ and said post space exceeds said probe space by between $\lambda_{g_{avg}}/14$ and $\lambda_{g_{avg}}/10$.

42. An antenna for coupling orthogonally-polarized microwave signals to first and second signal lines, comprising:

a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a post extending into said waveguide from said wall and terminating in a post end which is spaced from said wall by a post space which exceeds said probe space; and first and second probe tips formed respectively by said first and second microwave probes and spaced from said post by a tip space to generate a post-to-tip capacitance;

wherein said microwave signals have an average wavelength $\lambda_{g_{avg}}$ and said probe space is between $\lambda_{g_{avg}}/6$ and $\lambda_{g_{avg}}/4$.

43. An antenna for coupling orthogonally-polarized microwave signals to first and second signal lines comprising:

a waveguide having an open end for receipt of said microwave signals and terminating in a transverse wall;

a substrate carrying first and second signal lines which respectively terminate in first and second coplanar and orthogonal microwave probes, said substrate joined with said waveguide with said microwave probes extending into said waveguide and spaced from said wall by a probe space;

a post extending into said waveguide from said wall and terminating in a post end which is spaced from said wall by a post space which exceeds said probe space; and first and second probe tips formed respectively by said first and second microwave probes and spaced from said post by a tip space to generate a post-to-tip capacitance;

wherein said waveguide is a square waveguide, said post is a cylindrical post and said square waveguide and said cylindrical post are coaxially arranged.

44. An antenna for coupling orthogonally-polarized microwave signals to first and second signal lines, comprising:

a waveguide having an open end for receipt of said microwave signals and terminating in a transverse wall;

a substrate carrying first and second signal lines which respectively terminate in first and second coplanar and orthogonally-arranged microwave probes, said substrate joined with said waveguide with said microwave probes extending into said waveguide and spaced from said wall by a probe space:

a post extending into said waveguide from said wall and terminating in a post end which is spaced from said wall by a post space which exceeds said probe space; and first and second probe tips formed respectively by said first and second microwave probes and spaced from said post by a tip space to generate a post-to-tip capacitance;

wherein said first and second microwave probes and said post are arranged so that at least a portion of said post is positioned between said first and second probe tips;

and wherein said substrate includes a ground plane and at least a portion of each of said first and second signal lines and said ground plane are arranged as a microstrip transmission line.

45. The antenna of claim 44, wherein said first and second microwave probes have a probe width and said first and second probe tips have a tip width which is wider than said probe width.

46. The antenna of claim 44, wherein said substrate includes a plurality of plated-through holes and said waveguide includes:

a first waveguide portion which includes said open end; and a second waveguide portion which includes said wall;

and wherein said substrate is positioned between said first and second waveguide portions with said plated-through holes positioned to electromagnetically connect said first and second waveguide portions.

47. The antenna of claim 44, wherein said waveguide includes a tapered horn at said open end to enhance the receipt of said microwave signals.

48. The antenna of claim 44, wherein said waveguide forms first and second apertures which are positioned to receive said first and second signal lines.

49. A method for receiving orthogonally-polarized microwave signals, comprising the steps of;

spacing first and second orthogonal probes above an antenna end wall;

aligning said first and second probes with said orthogonally-polarized microwave signals;

isolating said first and second with a post which is coupled to said end wall;

spacing a tip of each of said first and second probes from said post by a tip space to generate a post-to-tip capacitance;

providing first and second low-noise amplifiers which require an input impedance of gamma opt to enhance their low-noise performance;

coupling said first and second low-noise amplifiers respectively to said first and second probes with respective first and second transmission lines that each have a line length; and selecting said tip space and said line length to present an impedance to said first and second low-noise amplifiers of substantially gamma opt.

50. The method of claim 49, further including the step of carrying said first and second probes, said first and second low-noise amplifiers and said first and second transmission lines on a substrate.

51. The method of claim 49, further including the step of choosing an impedance of said first and second transmission lines which facilitates the realization of said gamma opt.

* * * * *